Feb. 23, 1937. H. W. ROTH 2,071,473
SWITCH ACTUATING DEVICE FOR ELECTRIC WELDING MACHINES
Filed June 3, 1932 3 Sheets-Sheet 1

INVENTOR
Henry W. Roth,
BY
Barthel & Barthel
ATTORNEYS

Feb. 23, 1937. H. W. ROTH 2,071,473
SWITCH ACTUATING DEVICE FOR ELECTRIC WELDING MACHINES
Filed June 3, 1932 3 Sheets-Sheet 2

INVENTOR
Henry W. Roth,
BY
ATTORNEYS

Feb. 23, 1937.  H. W. ROTH  2,071,473
SWITCH ACTUATING DEVICE FOR ELECTRIC WELDING MACHINES
Filed June 3, 1932  3 Sheets-Sheet 3
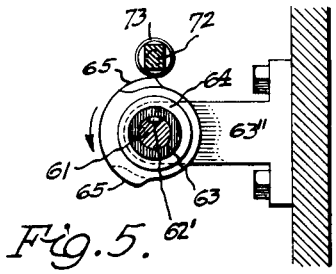
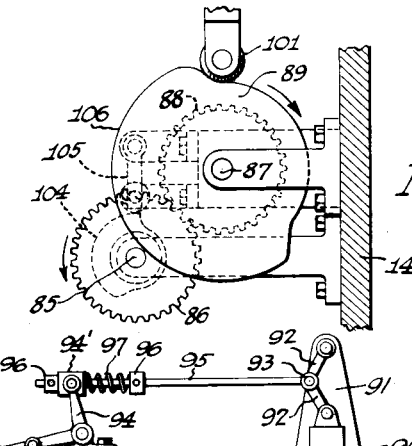
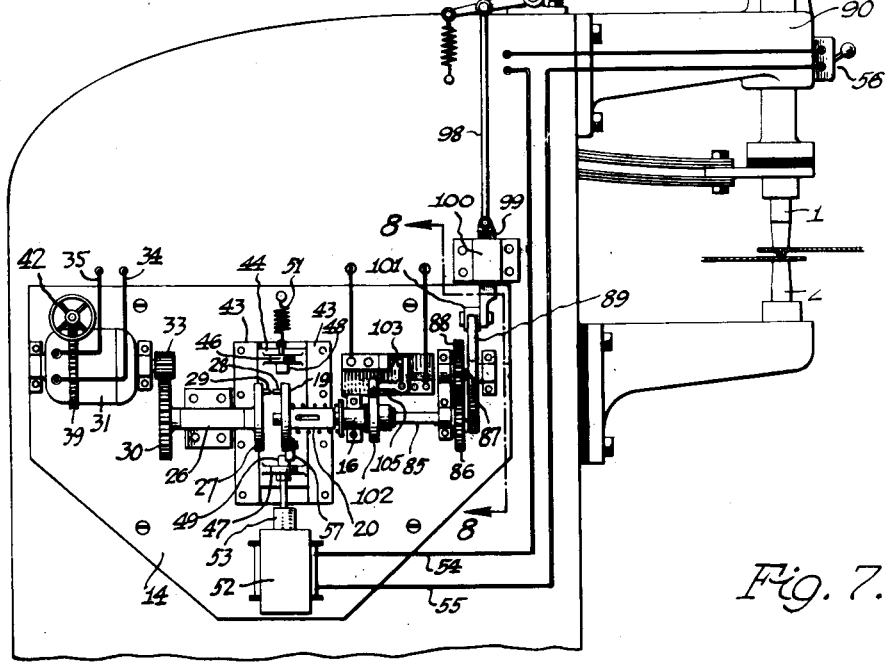
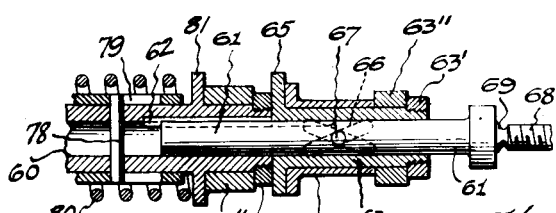
INVENTOR
Henry W. Roth,
BY
ATTORNEYS Patented Feb. 23, 1937

2,071,473

UNITED STATES PATENT OFFICE 2,071,473

SWITCH ACTUATING DEVICE FOR ELECTRIC WELDING MACHINES

Henry W. Roth, Detroit, Mich.

Application June 3, 1932, Serial No. 615,203

2 Claims. (Cl. 219—4)

The present invention pertains to a novel mechanism for operating the main switch in an electrical welding machine operated by alternating current. The switch is generally opened and closed at frequent intervals, in some cases several times a minute, and this causes the switch contacts to burn out rapidly because of arcing. The object of the present invention is to operate the switch, particularly in opening, in such a manner that no arcing will occur, and this is accomplished generally by a mechanism whereby the switch is operated only when the characteristics of the alternating current at the switch are such as to produce no serious arcing. In practice, these conditions are satisfied if the switch is opened and closed when the current value is zero.

The mechanism for this operation consists of a cam operating on the movable element of the switch and driven through a clutch from a synchronous motor which receives alternating current from the same source as do the switch and electrodes. The relation between the cam, clutch and motor is such that the switch is opened or closed only when the current value is zero. The adjustment may be made or corrected by means of an adjustable field at the motor or by means of an adjustable cam.

The invention further embodies a mechanism operable from the switch actuating member for separating the electrodes immediately after the opening of the switch and for bringing them together immediately before closing of the switch, in the case of spot and projection welding, whereby these changes in position are made while the electrode circuit is open, so that there will be no arcing at the electrodes. Similarly in flash and butt welding, the electrodes are separated after the opening of the switch and brought together before the closing of the switch.

The invention is fully disclosed by way of example in the following description and in the accompanying drawings, in which—

Fig. 5 is a section on the line 5—5 of Figure 4;

Fig. 6 is a detail of Figure 4;

Fig. 7 is an elevation of another modified construction; and

Fig. 8 is a section on the line 8—8 of Figure 7.

Reference to these views will now be made by use of like characters which are employed to designate corresponding parts throughout.

Figure 1:
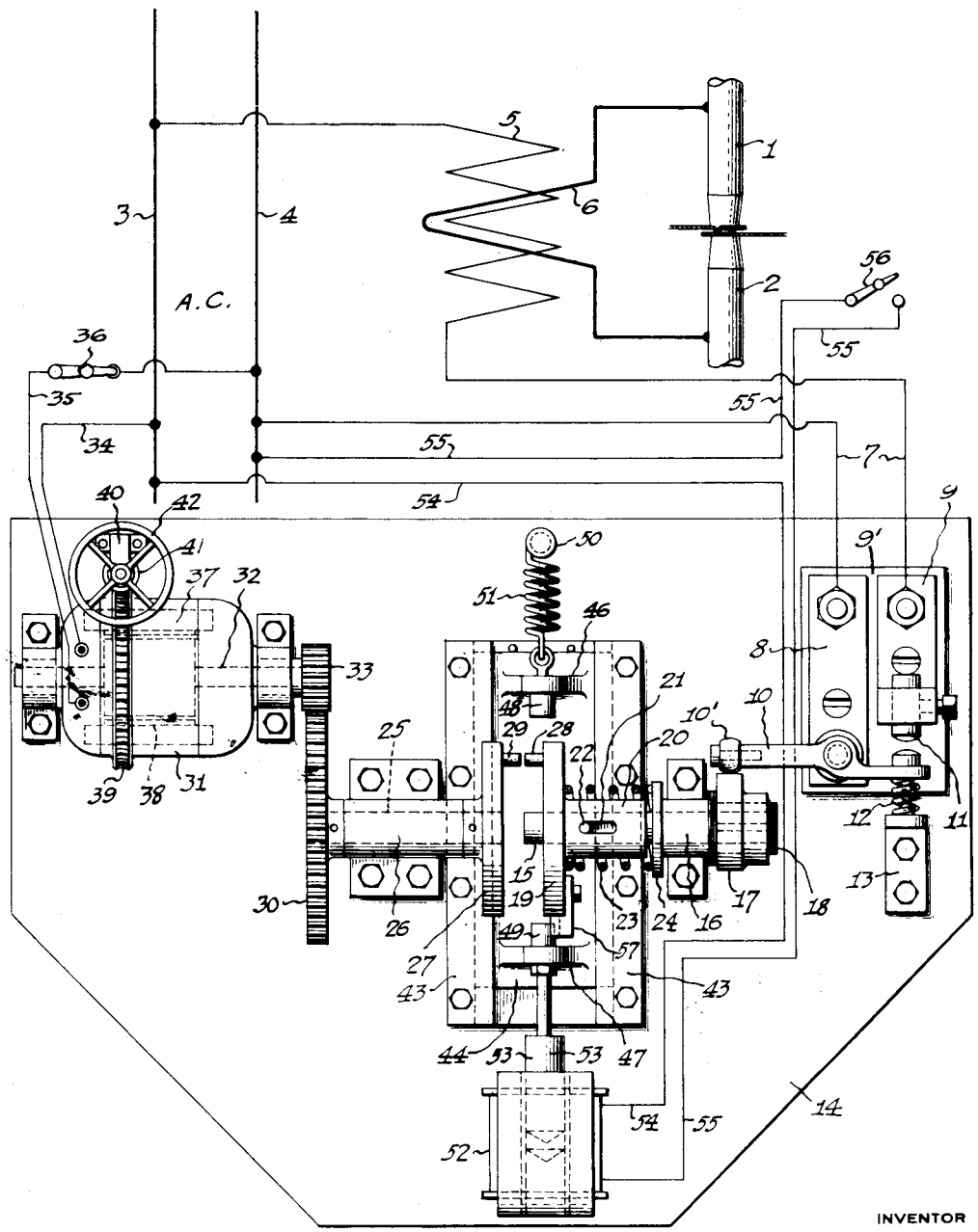
Figure 1 is an elevation of the circuit breaking apparatus, showing the electrical wiring diagrammatically.

In Figure 1 are illustrated the electrodes 1 and 2 of a welding machine. Current is supplied from lines 3 and 4 across which is connected the primary winding 5 of a transformer having its secondary winding 6 connected to the electrodes. In the conductor 7 which connects the primary winding to the line 4 is inserted a switch comprising a pair of spaced conducting plates 8 and 9 insulated from the base by a suitable panel 9' and which constitute a gap in the line 7. To the plate 9 is pivoted a movable switch member 10, and the other plate 9 carries a contact stud 11. The adjacent end of the member 10 is normally held in contact with the member 11 by means of a spring 12 resting on a fixed bracket 13. The switch 10, 11, governs the flow of current to the primary winding 5 and hence to the electrodes 1 and 2 and is operable only in a definite relation to the condition of the current in the lines 3 and 4 as will presently appear.

Figure 2:
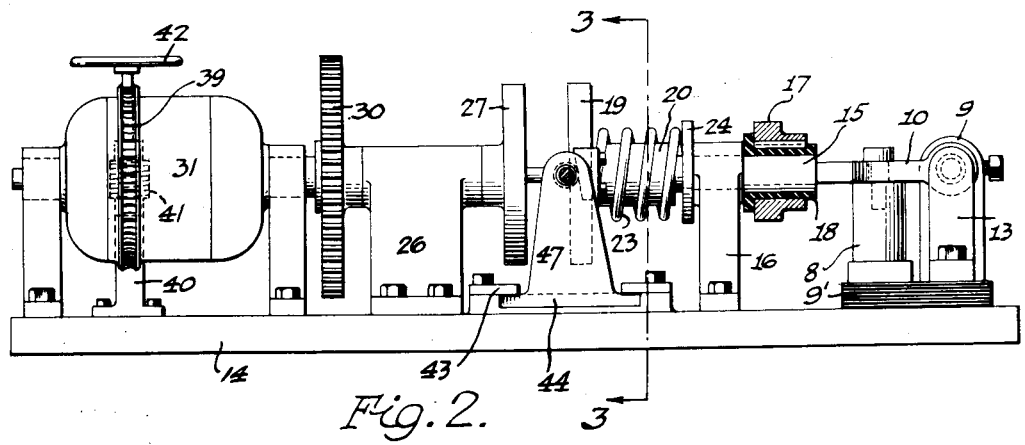
Fig. 2 is a detail plan view of said apparatus, partly in section.
Figure 3:
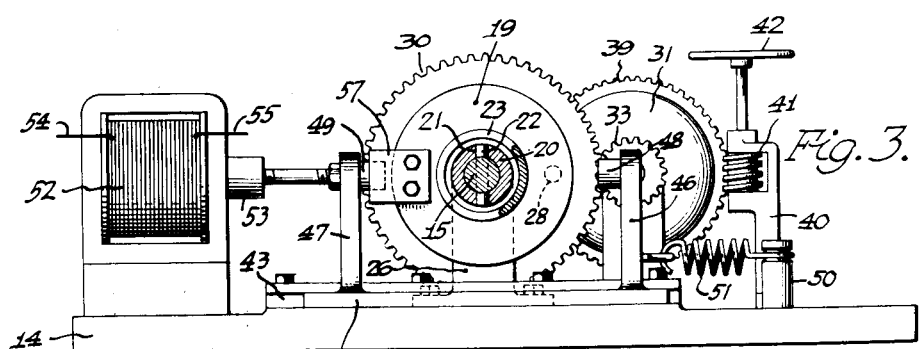
Fig. 3 is a section on the line 3—3 of Figure 2.

On the frame 14 of the machine is journaled a shaft 15 in a bearing 16 as shown more clearly in Figures 2 and 3. The shaft carries a cam 17 insulated therefrom by a suitable bushing 18 and engaging a roller 10' mounted on the non-contacting end of the movable switch member 10. The shaft also carries a clutch disk 19 having a hub or sleeve 20 formed with longitudinal slots 21 which receive a pin 22 passed through the shaft. The clutch disk is urged in the direction away from the cam 17 by a spring 23 surrounding the hub 20 and bearing against the disk 19 and another disk 24 mounted on the shaft adjacent the bearing 16.

Another shaft 25 is mounted in line with the shaft 15 and supported in a bearing 26 also secured to the frame member 14. The shaft 25 carries a clutch disk 27 directly opposite the disk 19 and adapted to drive the same through the medium of pins 28 and 29 carried by the disks 19 and 27 respectively. The other end of the shaft 25 carries a gear 30 through which it is driven from a synchronous motor 31, the latter having a shaft 32 with a pinion 33 thereon meshing with the gear. This motor is connected across the lines 3 and 4 by means of conductors 34 and 35, and a switch 36 is inserted in one of these conductors. The part of the motor casing 37 which carries the field windings 38 is rotatably adjustable with reference to the remainder of the casing and is surrounded by a worm gear 39 fixed thereto. Adjacent the worm gear is a bearing 40 in which is journaled a worm 41 meshing with the worm gear and having a hand wheel 42 for actuation whereby the casing portion 37 may be adjusted for a purpose which will presently be described.

Beneath the space between the disks 19 and 27, a guide member 43 is secured to the frame member 14 and lies transversely of the shafts 15 and 25. A slide 44 is mounted in the guide and has lugs 46 and 47 at its ends as shown more clearly in Figure 1. Studs 48 and 49 are fixed to the lugs and extend inwardly towards the clutch disks. The lug 46 is connected to a fixed stud 50 by a spring 51 which tends to maintain the slide 44 in a given normal position. Adjacent the other end of the slide is a solenoid 52 having its core or plunger 53 secured to the lug 47. Thus, when the solenoid is energized, it pulls the slide 44 against the action of the spring 51. The solenoid is connected across the lines 3 and 4 by conductors 54 and 55, and in the latter is inserted a switch 56.

The clutch disk 19 carries a wedge stop 57 adapted to engage either of the studs 48 and 49 and compress the spring 23 until the corresponding sliding movement of the hub 20 is stopped by the pin 22, as shown in Figure 3. In this limiting position of the hub, the wedge does not clear the stud which it engages, as shown in Figure 2, as a result of which the stud and wedge cooperate as a positive stop for the clutch disk.

In the operation of the device the main circuit is closed at the switch 10, 11, during welding, and the switch 56 is also closed to energize the solenoid. In this position the slide is drawn by the solenoid, and the clutch disks 19 and 27 are spaced by the engagement of the wedge 57 with the stud 48. In order to open the switch 10, 11 and thus stop the flow of current between the electrodes 1 and 2, the solenoid 52 is de-energized by opening the switch 56. The slide 44 is thus drawn by the spring 51 away from the solenoid, releasing the stud 48 from the wedge 57 and permitting the spring 23 to move the disk 19 towards the disk 27, whereby the pin 28 is brought into the path of the constantly rotating pin 29. When these pins make contact, the disk 19 is driven, and the wedge 57 is moved towards the stud 49. The solenoid circuit is still open, so that the stud 49 lies in the path of the wedge 57 which, on striking the stud 49, opens the clutch and stops the disk 19 in the manner already described. The cam 17 has meanwhile made a half turn whereby its high point is brought into contact with the roller 10' to open the switch 10, 11 and thus arrest flow of current between the electrodes, as illustrated in Figure 1.

The cam 17 maintains a definite relative position with respect to the motor and hence with the current value in the lines 3, 4, and an adjustment in this relation is initially made so that the cam opens the switch 10, 11 when the alternating current value in the lines 3, 4, is at or approximate to the zero point on the sine curve. This adjustment is made at the hand wheel 42 as already indicated. Thus, the opening of the primary circuit at the switch 10, 11 during zero or a very small current value is accompanied by no objectionable arcing. The electrodes 1 and 2 are then separated manually or mechanically by any suitable means. To make another weld, the electrodes are brought together, and then the switch 56 is closed to permit the solenoid to return the slide 44 to its normal position. As the stud 49 disengages the wedge 57, the disk 19 makes another half turn until stopped by the engagement of the wedge 57 with the stud 48. This movement brings the low point of the cam 17 in contact with the roller 10', so that the switch 10, 11 is closed and current again supplied to the transformer 5, 6. The ratio of the gears 30 and 33 is such that the switch 10, 11 also closes at or near the zero value of the main current, so that there is no serious arcing in the closing of the switch.

Figure 4:
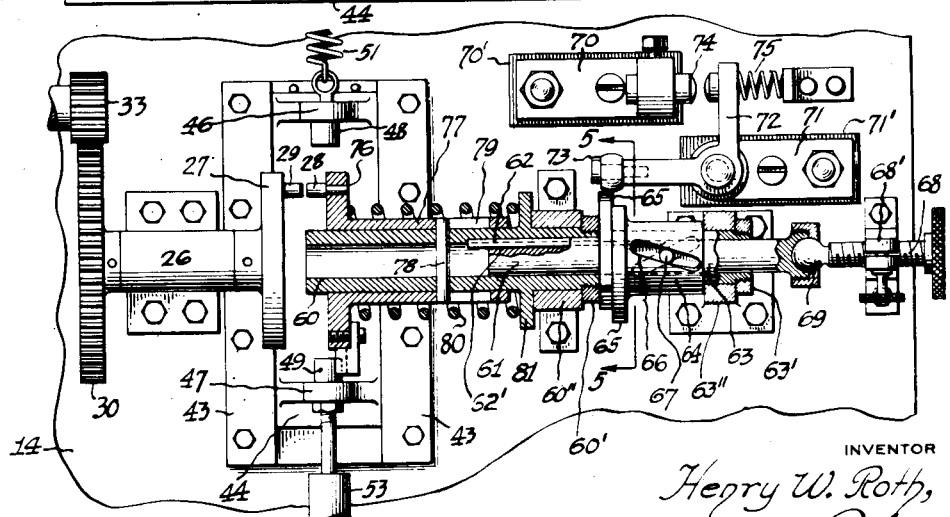
Fig. 4 is an elevation, partly in section, of a modified form of circuit breaker.

In the modification shown in Figures 4, 5 and 6, the cam also is made adjustable for predetermining the moment of closing the switch in the primary circuit. The driven mechanism embodies a hollow shaft 60 and a solid shaft 61 telescoped therein and maintained in sliding relation by means of a key 62 extending in a groove 62'. The cam comprises a pair of sleeves 63 and 64 mounted concentrically on the shaft 61 and having each a high cam portion 65. Each of the sleeves has a diagonal slot 66, and a pin 67 passing through the shaft extends into both slots. The angular relation of the cam sleeves and the combined length of the high portions 65 is adjustable by sliding the shaft 61 in the shaft 60. For this purpose a screw 68 is mounted on the frame and universally connected as at 69 to one end of the shaft 61. After the screw has been adjusted, it is locked by a clamp 68'. To prevent movement of the shaft 60 and the sleeve 63 towards the driving clutch member when the screw 68 is turned in that direction, the members 60 and 63 carry nuts 60' and 63' which respectively engage the bearings 60" and 63" for these parts.

The contacts of the main switch are indicated at 70 and 71, insulated from the frame by panels 70' and 71', and the movable switch element is in the form of a bell crank lever 72 pivoted to the contact 71. One end of the lever carries a roller 73 riding on the adjustable cam, and the other end is normally moved towards a contact 74 on the member 70 by means of a spring 75. The driven member of the clutch is similar to that already described, embodying a disk 76 having a hub 77 surrounding the hollow shaft 60. A pin 78 in the shaft passes through longitudinal slots 79 in the sleeve. A spring 80 surrounding the sleeve and bearing against the disk 76 and a collar 81 on the shaft 60 tends to move the disk to engaging position.

The remaining parts of the device and the operation are as illustrated and described in connection with Figures 1, 2 and 3, with the exception that the moment of opening the switch and the moment of closing it are adjustable, with reference to the current value at the cam, as well as at the synchronous motor.

In the modification illustrated in Figures 7 and 8, mechanism is provided for separating the electrodes immediately after opening of the main switch and for bringing them together immediately before closing of the main switch, in spot and projection welding. The driven clutch shaft 85 carries a gear 86 adjacent which is journaled a shaft 87 on the frame. This shaft carries a gear 88 meshing with the gear 86 and also a cam 89 for a purpose which will presently appear.

The upper electrode 1 is slidable vertically in a head member 90 and is joined to a bracket 91 on this member by a pair of links 92 pivoted respectively to this member and the electrode and having their inner ends pivoted together at 93. A bell crank lever 94 is pivoted on the frame above the cam 89 and carries at one end a block 94'. A rod 95 attached at the pivot point 93 passes slidably through the block. Stops 96 are secured to the rod 95 at opposite sides of the block 94', and a spring 97 surrounds the rod between the block and the forward stop 96 which is nearer the member 91. A link 98 extends from the other arm of the bell crank lever 93 and carries at its lower end a slide 99 passing through a guide 100 on the frame. The guide carries a roller or follower 101 which rides on the cam 89 as shown more clearly in Figure 8.

The clutch shaft 85 carries a cam 102 which opens the main switch 103 when its high portion 104 engages the movable switch member 105 in substantially the manner described in connection with Figure 4. Also, the cam 89 moves the upper electrode 1 towards the lower electrode 2 when its high part 106 engages the follower 101.

The cams 89 and 102 move respectively in clockwise and counterclockwise direction as indicated by the arrows in Figure 8. This figure also shows relative positions of the high portions 104 and 106, and it will be seen that the roller 101 will be engaged by the high portion 106 to bring the electrodes 1 and 2 together at an instant before the movable switch member drops off the high portion 104 to close the main switch 103. The lengths of the high and low portions of both cams are so determined that, conversely, the roller 101 is dropped off the high portion 106 to raise the upper electrode 1 an instant after the movable switch member 105 is engaged by the high portion 104 to open the main switch. Thus, it is assured that there is no current in the electrodes 1 and 2 when they are first brought together or separated, with the result that arcing cannot occur at the electrodes.

In flash and butt welding it is desirable to separate the electrodes immediately after opening the switch and to bring them together immediately before closing the switch. It is evident that this sequence of operation is possible by the mechanism already described, requiring only a corresponding adjustment of the cam 89.

Although specific embodiments of the invention have been illustrated and described, it will be understood that various alterations in the details of construction may be made without departing from the scope of the invention, as indicated by the appended claims.

What I claim is:—

1. In a spot welder for operation on an alternating current circuit, the combination with a reciprocatory electrode, of a circuit interrupter, a synchronous motor connected to said alternating current circuit, means for actuating both said electrode and said interrupter from said motor to cause both said electrode and said interrupter to act once during the occurrence of a whole number of half-cycles of alternating current.

2. In a spot welder for operating on an alternating current circuit, the combination with a movable electrode adapted to make and break contact with the work, of current interrupting means, and means for actuating both said electrode and said interrupting means in synchronism with the alternating current wave.

HENRY W. ROTH.